United States Patent
Kessler et al.

(10) Patent No.: US 10,558,573 B1
(45) Date of Patent: Feb. 11, 2020

(54) METHODS AND SYSTEMS FOR DISTRIBUTING MEMORY REQUESTS

(71) Applicant: CAVIUM, LLC, San Jose, CA (US)

(72) Inventors: Richard E. Kessler, San Jose, CA (US); David Asher, San Jose, CA (US); Shubhendu S. Mukherjee, San Jose, CA (US); Wilson P. Snyder, II, San Jose, CA (US); David Carlson, San Jose, CA (US); Jason Zebchuk, San Jose, CA (US); Isam Akkawi, San Jose, CA (US)

(73) Assignee: Cavium, LLC, San Jose, CA (US)

( * ) Notice: Subject to any disclaimer, the term of this patent is extended or adjusted under 35 U.S.C. 154(b) by 0 days.

(21) Appl. No.: 16/128,369

(22) Filed: Sep. 11, 2018

(51) Int. Cl.
  *G06F 12/0813* (2016.01)
  *G06F 12/0844* (2016.01)

(52) U.S. Cl.
  CPC ...... *G06F 12/0844* (2013.01); *G06F 12/0813* (2013.01); *G06F 2212/1016* (2013.01); *G06F 2212/608* (2013.01)

(58) Field of Classification Search
  None
  See application file for complete search history.

(56) References Cited

U.S. PATENT DOCUMENTS

| | | | |
|---|---|---|---|
| 7,685,354 B1 * | 3/2010 | Hetherington | G06F 12/084 711/163 |
| 2010/0293345 A1 * | 11/2010 | Sonnier | G06F 15/167 711/154 |
| 2016/0147666 A1 * | 5/2016 | Li | G06F 12/0897 711/122 |
| 2018/0157967 A1 * | 6/2018 | Henry | G06N 3/0445 |

* cited by examiner

*Primary Examiner* — Brian R Peugh

(57) ABSTRACT

A memory request, including an address, is accessed. The memory request also specifies a type of an operation (e.g., a read or write) associated with an instance (e.g., a block) of data. A group of caches is selected using a bit or bits in the address. A first hash of the address is performed to select a cache in the group. A second hash of the address is performed to select a set of cache lines in the cache. Unless the operation results in a cache miss, the memory request is processed at the selected cache. When there is a cache miss, a third hash of the address is performed to select a memory controller, and a fourth hash of the address is performed to select a bank group and a bank in memory.

22 Claims, 7 Drawing Sheets

METHODS AND SYSTEMS FOR DISTRIBUTING MEMORY REQUESTS

BACKGROUND

A primary factor in the utility of a computer system is the speed at which the computer system can execute an application. It is important to have instructions and data available at least as fast as the rate at which they are needed, to prevent the computer system from idling or stalling while it waits for the instructions and/or data to be fetched from memory (e.g., main memory and caches).

Significant advances continue to be achieved in microprocessor technologies and architectures. These advances have resulted in substantial increases in processing power or speed and in the capacity of on-chip memory (e.g., caches). Increases in processing speed have been achieved by including multiple central processing unit cores ("core processors" or "cores") on a chip. Each core processor can initiate transactions such as memory requests to read/load data from or store/write data to memory.

In modern communication networks, many applications that are performed at network nodes are executable in parallel, which makes multi-core chips particularly useful in network devices such as routers, switches, servers, and the like. The complexity and bandwidth of modern communication networks have been increasing with increasing demand for data connectivity, network-based applications, and access to the Internet. Accordingly, the number of core processors in multi-core chips has been increasing in recent years to accommodate the demand for more processing power within network devices.

However, as the number of core processors within a chip increases, managing access to corresponding on-chip memory as well as attached memory (e.g., main memory) becomes more and more challenging. For example, when multiple core processors issue memory requests simultaneously, contention can occur between requests when they are directed to the same memory component, and congestion increases in the network/system that is transporting the requests. These problems can increase latency and decrease performance.

SUMMARY

Embodiments according to the present invention provide an efficient and flexible mechanism for distributing memory requests among different memory components (e.g., caches, memory controllers, and main memory), thereby reducing latency and improving performance in multi-core chips and systems that use them.

In embodiments, a memory request that includes an address is generated by a core processor. The memory request also specifies a type of an operation (e.g., a read/load operation or a store/write operation) associated with an instance (e.g., a block) of data. A group of caches is selected using a particular bit in the address. In an embodiment, the bit is hashed (e.g., XORed) with selected other bits in the address to select the group of caches. A first hash of the address is performed to select a cache in the selected group. In an embodiment, a second hash of the address is also performed to select a set of cache lines in the selected cache. Unless the operation specified in the memory request results in a cache miss, the memory request is processed at the selected cache.

In an embodiment, the caches are tag-and-data caches (TADs), and the address (or a portion of the address) is compared to corresponding bits in the tag. A cache hit occurs when the address matches a tag in the cache lines.

In an embodiment, when there is a cache miss, a third hash of the address is performed to select a memory controller. In an embodiment, a fourth hash of the address is also performed to select a bank group and a bank in main memory (e.g., dynamic random access memory, DRAM). In an embodiment, the third and fourth hashes are also performed when there is a cache write-back operation or a cache replacement operation.

In embodiments, the bits used to select a group of caches is chosen so that requests are distributed in an intended manner across different groups of caches; the first hash is configured to achieve an intended distribution of requests across different caches in the selected group; the second hash is configured to achieve an intended distribution of requests across different sets of cache lines in the selected cache; the third hash is configured to achieve an intended distribution of requests across different memory controllers; and the fourth hash is configured to achieve an intended distribution of requests across different bank groups and banks. Accordingly, contention between memory requests is alleviated and congestion in the network/system used to transport the requests is reduced. Different bits can be selected and the configurations of the hashes can be independently changed to refine or tailor the distributions of the request and fine tune performance. In an embodiment, each hash in the memory request distribution process is programmable so that the process can be adjusted to achieve a particular performance-based objective.

For example, in some instances as just described, it might be advantageous to distribute the memory requests to the cache and main memory such that the requests can occur simultaneously but contention and congestion in the network/system that is transporting the requests are avoided or reduced, and to spread out the requests between memory components that handle the requests to improve bandwidth and reduce latency. In other instances, for example, it might be advantageous to send consecutive memory requests or requests within a certain address range to the same memory controller, to take advantage of certain memory controller page policies like the open-page policy. In yet other instances, for example, it might be advantageous to target a range of addresses to a specific cache or cache group depending on the proximity of the cache or cache group to the requesting core processor or to main memory.

In summary, embodiments according to the present invention distribute memory requests from a processor or processors to different caches (e.g., TADs) and, if necessary, to different memory (e.g., DRAM) controllers and memory locations, thereby reducing latency and improving performance. The methods for distributing requests are flexible and can be efficiently implemented so that they do not introduce latency.

These and other objects and advantages of the various embodiments according to the present invention will be recognized by those of ordinary skill in the art after reading the following detailed description of the embodiments that are illustrated in the various drawing figures.

This summary contains, by necessity, simplifications, generalizations, and omissions of detail; consequently, those skilled in the art will appreciate that this summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Figure 1:
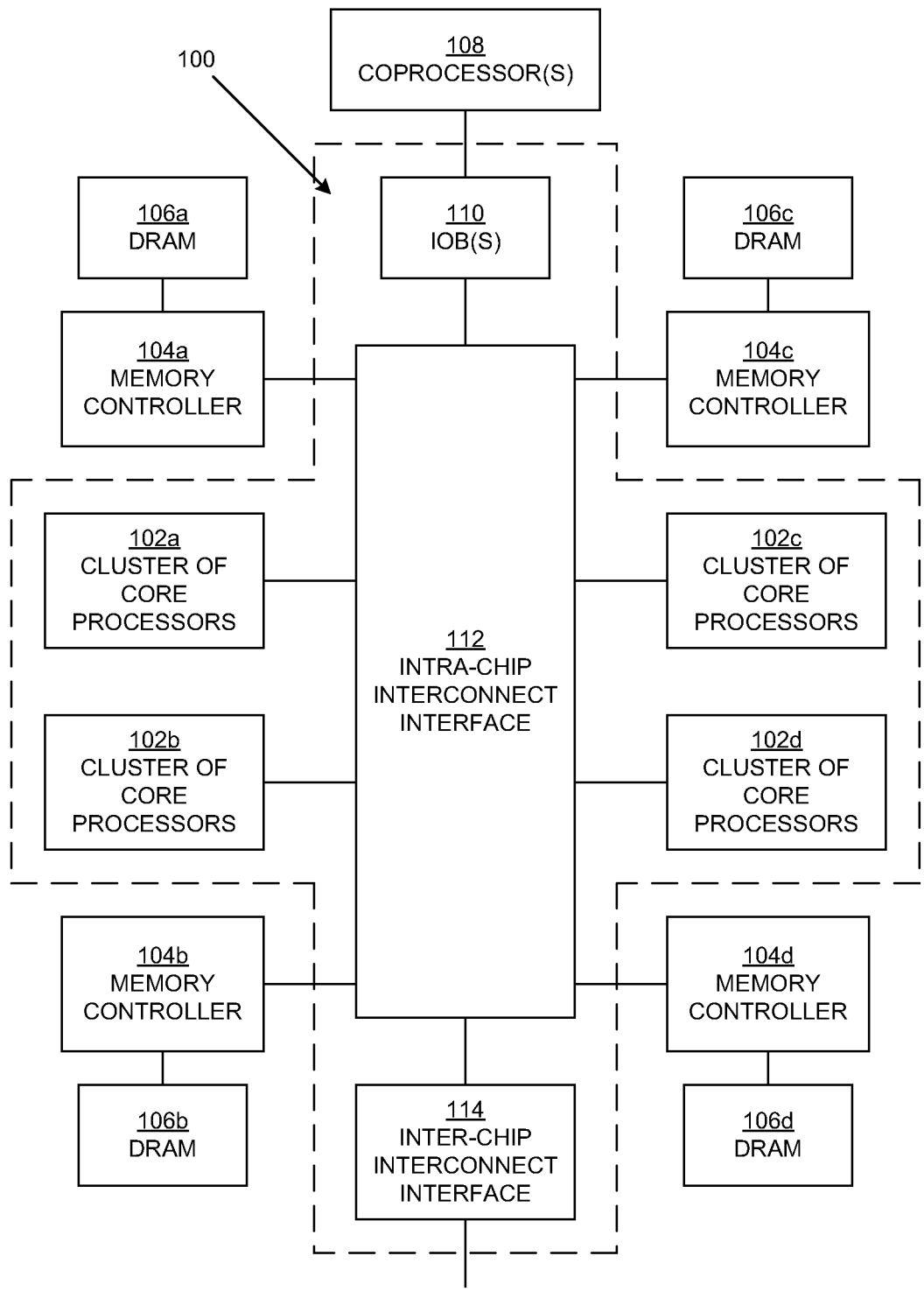
FIG. 1 is a block diagram illustrating an example of an architecture of a system (e.g., a chip) upon which embodiments according to the present invention can be implemented.

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "generating," "determining," "accessing," "selecting," "applying," "hashing," "performing," "processing," "reading," "writing," "copying," "loading," "storing," or the like, refer to actions and processes (e.g., the flowcharts 600 and 700 of FIGS. 6 and 7, respectively) of a computing system or similar electronic computing device or processor (e.g., the system 100 of FIG. 1). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), dynamic RAM, (DRAM), caches, read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

As used herein, a memory request refers to a message or command for information (e.g., a block of data) from a memory (e.g., a cache or main memory). A block of data, or data block, may also be referred to herein as an instance of data or simply as data. A memory request may be a read/load operation to request a copy of a data block. A memory request may be a store/write operation to store a cached data block, or parts of a cached data block, in main memory. A memory request may be a cache write-back operation or a cache replacement operation. These are examples only, and the present invention is not so limited.

FIG. 1 is a block diagram illustrating an example of an architecture of a system 100 (e.g., a chip) upon which embodiments according to the present invention can be implemented. In the example architecture of FIG. 1, the system 100 includes a number of core processors or central processing units (CPUs). In an embodiment, the core processors are arranged in multiple clusters 102a, 102b, 102c, and 102d (102a-d), which may be referred to herein individually or collectively as, respectively, the cluster or clusters 102. While four clusters are shown, embodiments according to the present invention are not so limited (as described further below).

Figure 2:
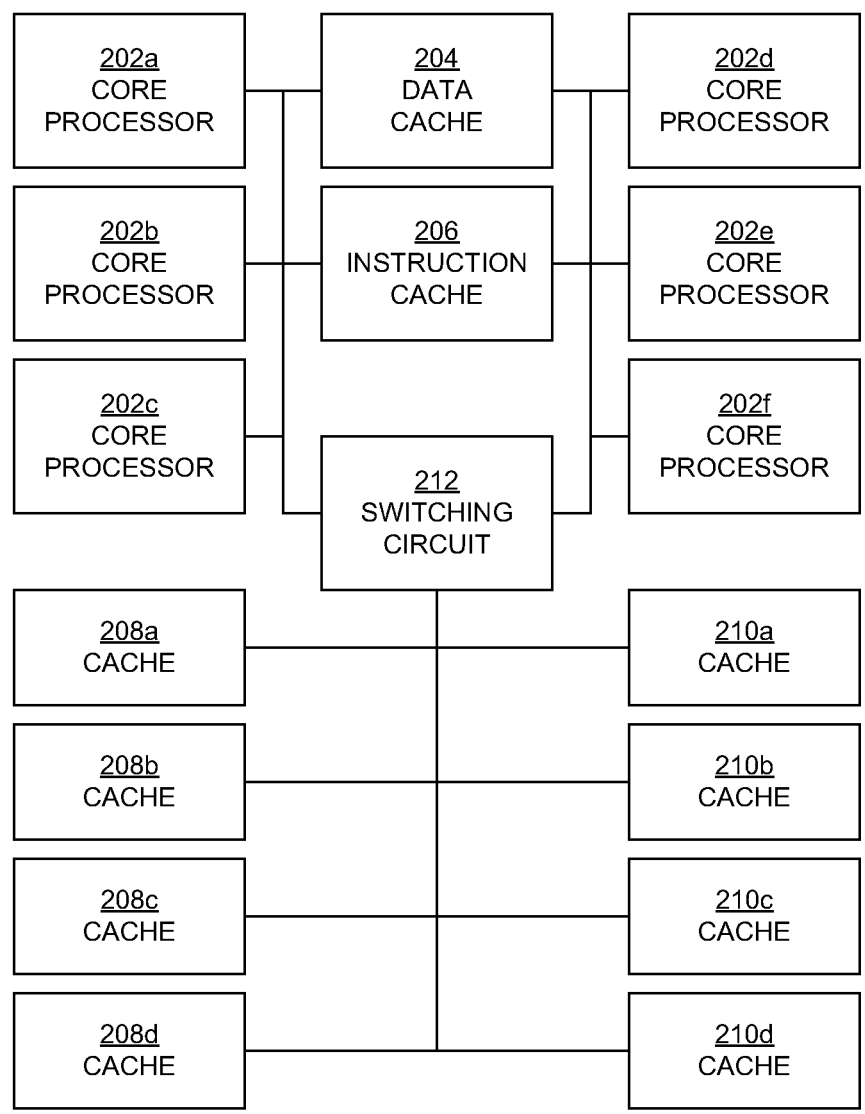
FIG. 2 is a block diagram illustrating an example of a cluster of core processors in an embodiment according to the present invention.

FIG. 2 is a block diagram illustrating an example of a cluster 102 of core processors in an embodiment according to the present invention. The cluster 102 may include components other than those shown or about to be described.

In the FIG. 2 embodiment, the cluster 102 includes six core processors 202a, 202b, 202c, 202d, 202e, and 202f (202a-f), which may be referred to herein individually or collectively as, respectively, the core processor 202 or core processors 202. The core processors 202 may also be known as application processors. While six core processors are shown, the present invention is not so limited.

In the FIG. 2 embodiment, a cluster 102 also includes at least one data cache 204 and at least one instruction cache 206, for storing data and instructions, respectively, within the cluster. The data cache 204 may be referred to as a level-one (L1) cache.

In the FIG. 2 embodiment, the cluster 102 also includes a shared cache, which may be referred to as a level-two (L2) cache or lower-level cache. In an embodiment, the shared cache is accessible to the core processors 202 through, for example, a switching circuit 212.

In an embodiment, the shared cache is partitioned into multiple caches 208a, 208b, 208c, 208d (208a-d) and 210a, 210b, 210c, and 210d (210a-d). In an embodiment, each of the caches 208a-d and each of the caches 210a-d is implemented as a tag-and-data cache (TAD). In the discussion to follow, these caches are referred to individually or collectively as the cache 208 or caches 208 and the cache 210 or caches 210, respectively. Also, the caches 208 may be referred to as a first group of caches or as the left group of caches, and the caches 210 may be referred to as the second group of caches or the right group of caches. While two groups of caches are described, with four caches in each group, the present invention is not so limited. That is, there may be more or less than four caches per group, and there may be more than two groups of caches.

Figure 3:
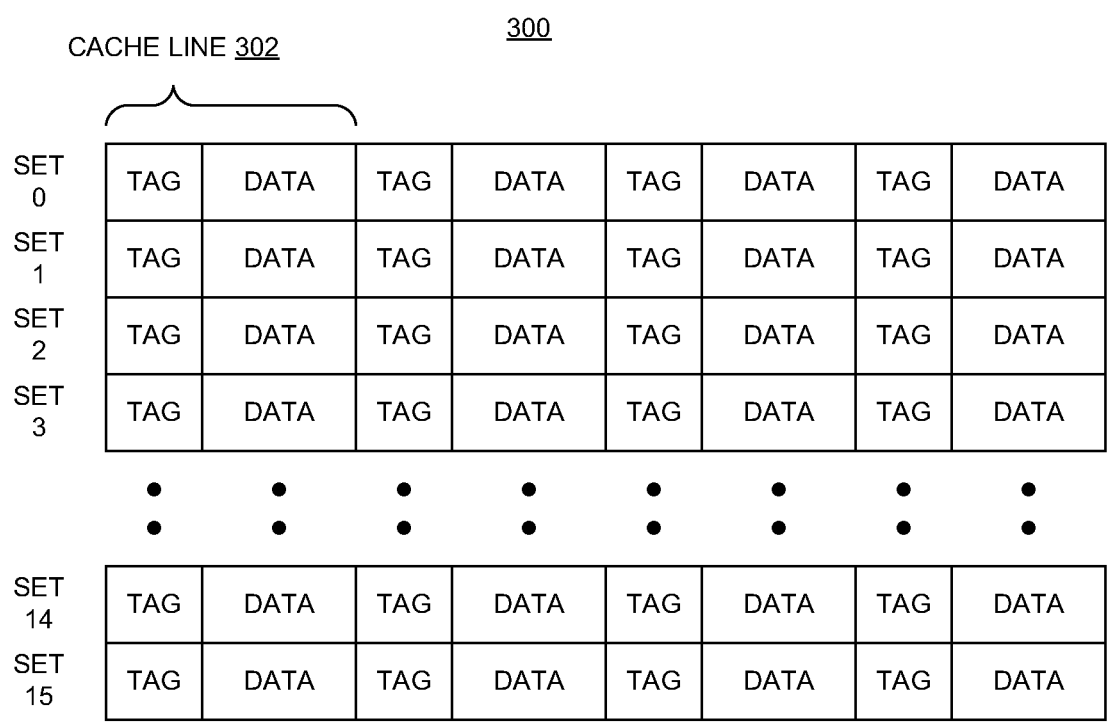
FIG. 3 illustrates an example of a four-way associative cache in an embodiment according to the present invention.

In an embodiment, each of the caches 208 and 210 is an N-way associative cache. FIG. 3 illustrates an example of a four-way associative cache 300 (e.g., a TAD) in an embodiment according to the present invention. In the example of FIG. 3, the cache 300 includes 16 sets of cache lines (SET0-SET15), and each set includes four cache lines (N=4), exemplified by the cache line 302. Each cache line includes a tag field and a data field. In an embodiment, each cache line also includes a valid bit (not shown).

In embodiments according to the present invention, a memory request is issued by a core processor 202 (FIG. 2). The memory request includes an address, and the address (or a portion of the address) is compared to corresponding bits stored in the tag field. In an embodiment, the address is used to derive a tag field, a set field, and an offset. In a read operation, for example, the set field is used to select a set of cache lines, and the tag in the tag field is compared to the tags in the tag fields of the selected set of cache lines. A cache miss occurs when the tag in the memory request does not match a tag in the selected set of cache lines.

With reference back to FIG. 1, the clusters 102 are coupled to one or more local memory controllers 104a, 104b, 104c, and 104d (104a-d). The memory controllers 104a-d are each configured to enable access to an external (or attached) memory, such as but not limited to dynamic random access memory (DRAM), also referred to herein as the main memory. The main memory may include multiple DRAMs 106a, 106b, 106c, and 106d, with each DRAM coupled to a respective memory controller. While four memory controllers and four DRAMs are shown in FIG. 1, embodiments according to the invention are not so limited, as described further below.

In embodiments, one or more coprocessors 108 are each coupled to the clusters 102 through a respective input/output (I/O) bridge (IOB) 110. As such, a coprocessor 108 is coupled to the core processors 202 and the caches 208 and 210 (FIG. 2) through an IOB 110. A coprocessor 108 may include, for example an I/O device, a compression/decompression processor, a hardware accelerator, a Peripheral Component Interconnect Express (PCIe) bus, or the like. Each coprocessor 108 can be configured to store data in, or load data from, the caches 208 and 210 (FIG. 2) in a cluster 102. A coprocessor 108 can also be configured to send, or assign, processing tasks to the clusters 102 (specifically, to the core processors 202 in the clusters). Accordingly, in an embodiment, the system 100 includes an intra-chip interconnect interface 112 that includes buses and is configured to couple the coprocessor 108 to the clusters 102, and is also configured to couple the coprocessor and the clusters to the memory controllers 104a-d. The coprocessor 108 can also be configured to receive data or processing tasks from other components such as other systems (e.g., chips), which may be like the system 100. Accordingly, in an embodiment, the system 100 also includes an inter-chip interconnect interface 114 that includes buses and channels and is configured to couple the system 100 to other systems. Thus, the system 100 is configured to exchange data and processing tasks with other systems.

Figure 4:
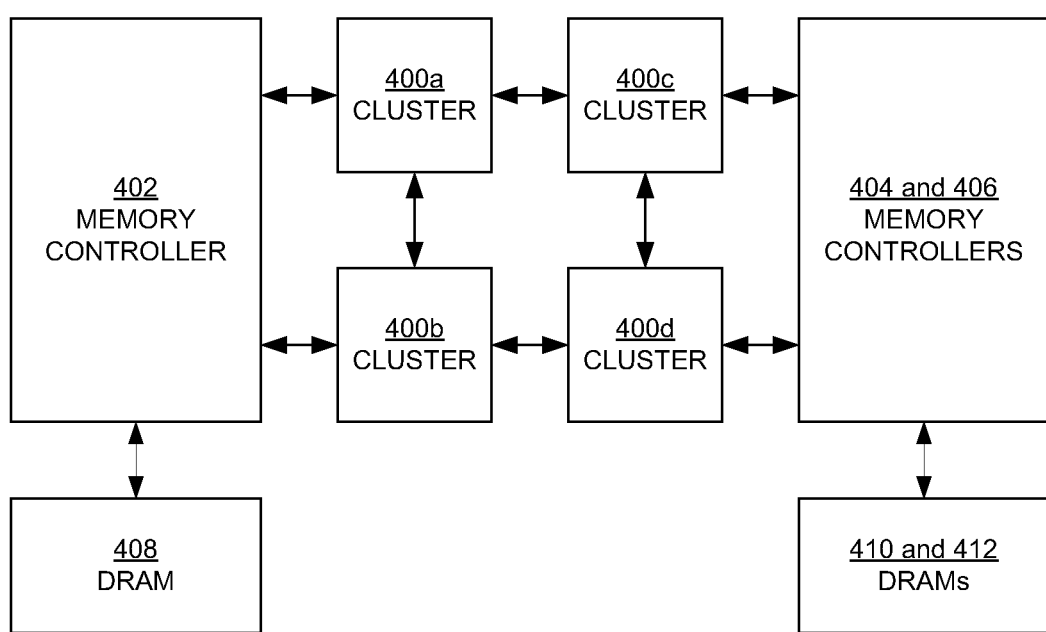
FIG. 4 is a block diagram illustrating four interconnecting clusters of core processors in a system in an embodiment according to the present invention.

FIG. 4 is a block diagram illustrating four interconnecting clusters 400a, 400b, 400c, and 400d (400a-d) in the system (chip) 100 (FIG. 1) in an embodiment according to the present invention. In an embodiment, each of the clusters 400a-d is exemplified by the cluster 102 of FIG. 2.

In the FIG. 4 embodiment, the clusters 400a-d are arranged and coupled to each other in a two-by-two mesh or array. In an embodiment, one memory controller 402 is physically located on one side of (e.g., the left side) and is coupled to the clusters 400a-d, and two memory controllers 404 and 406 are physically located on the opposite side of (e.g., the right side) and are coupled to the clusters 400a-d. In embodiments, the memory controller 402 is coupled to a DRAM 408, and the memory controllers 404 and 406 are coupled to DRAMs 410 and 412. However, a memory controller can be coupled to multiple DRAMs, and a DRAM may be coupled to multiple memory controllers.

Figure 5:
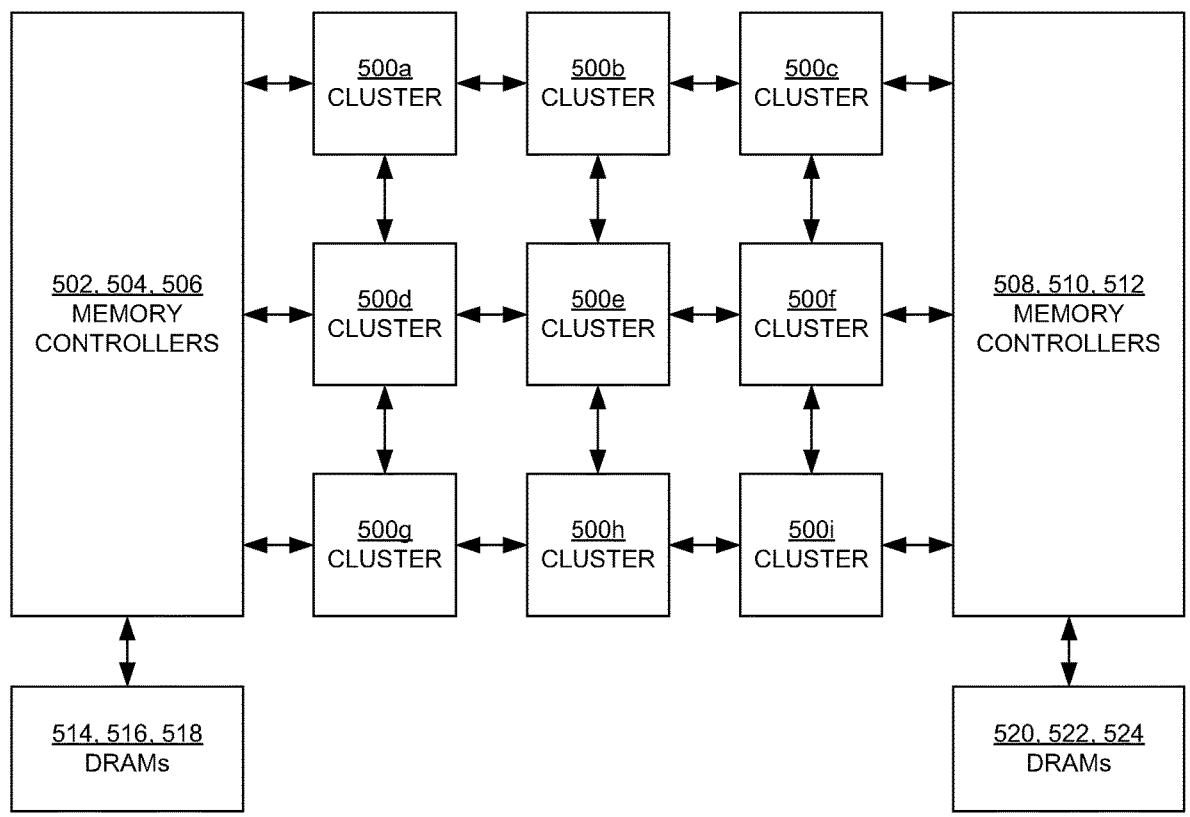
FIG. 5 is a block diagram illustrating nine interconnecting clusters of core processors in a system in an embodiment according to the present invention.

FIG. 5 is a block diagram illustrating nine interconnecting clusters 500a, 500b, 500c, 500d, 500e, 500f, 500g, 500h, and 500i (500a-i) in the system (chip) 100 (FIG. 1) in an embodiment according to the present invention. In an embodiment, each of the clusters 500a-i is exemplified by the cluster 102 of FIG. 2.

In the FIG. 5 embodiment, the clusters 500a-i are arranged and coupled to each other in a three-by-three mesh or array. In an embodiment, three memory controllers 502, 504, and 506 are physically located on one side of (e.g., the left side) and are coupled to the clusters 500a-i, and three memory controllers 508, 510, and 512 are physically located on the opposite side of (e.g., the right side) and are coupled to the clusters 500a-i. In embodiments, the memory controllers 502, 504, and 506 are coupled to a DRAMs 514, 516, and 518, and the memory controllers 508, 510, and 512 are coupled to DRAMs 520, 522, and 524. However, as noted above, a memory controller can be coupled to multiple DRAMs, and a DRAM may be coupled to multiple memory controllers.

Figure 6:
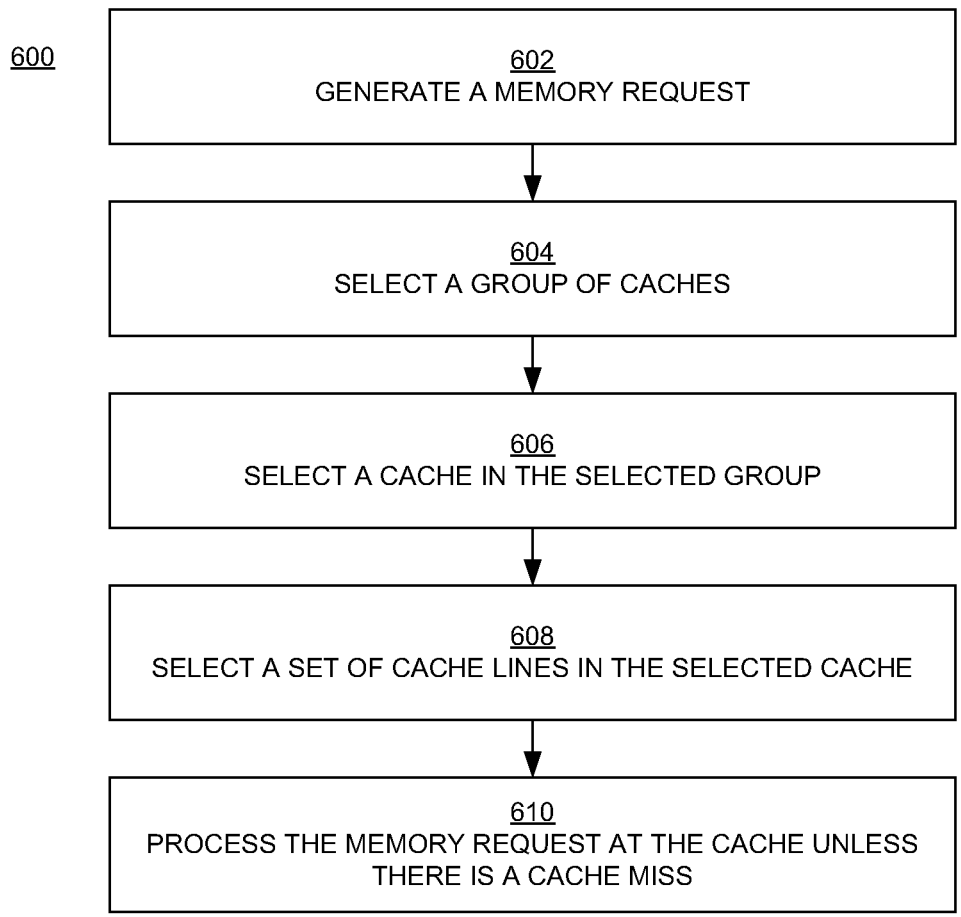
FIG. 6 is a flowchart of examples of operations in computer-implemented methods for distributing memory requests in embodiments according to the present invention.
Figure 7:
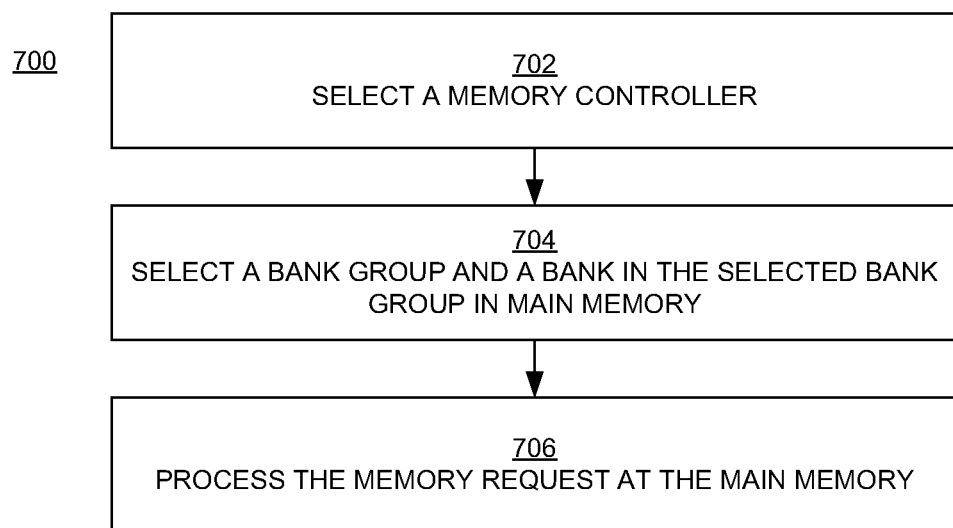
FIG. 7 is a flowchart of examples of operations in computer-implemented methods for distributing memory requests in embodiments according to the present invention.

FIGS. 6 and 7 are flowcharts 600 and 700, respectively, of examples of operations in computer-implemented methods for distributing memory requests in embodiments according to the present invention. The operations can be performed in and by the system 100 of FIG. 1, in particular by a core processor 202 (FIG. 2).

In block 602 of FIG. 6, a memory request, including an address, is generated by a core processor. The memory request also specifies a type of an operation (e.g., a read/load operation or a store/write operation) associated with an instance (e.g., a block) of data.

In block 604, a group of caches (e.g., TADs) is selected using a particular bit in the address. In an embodiment, the bit is hashed with other selected bits in the address to select the group of caches. In an embodiment, the bit and the selected other bits are selected based on achieving a specified distribution (e.g., an even distribution) of memory requests among groups of caches in the system 100; that is, the bit and the selected other bits are selected to achieve a desired distribution of a number of times each group of caches is selected in response to memory requests. For example, if there are two groups of caches, then the bit and the selected other bits are selected to achieve a distribution in which one-half, or about one-half, of the memory requests target one group of caches and the remaining requests target the other group of caches.

In block 606, a first hash of the address is performed to select a cache in the selected group of caches. In an embodiment, the first hash is based on a specified distribution of memory requests among caches in the system 100; that is, the first hash is configured to achieve a desired distribution of a number of times each cache is selected in response to memory requests. For example, if there are four caches per group, then the first hash is configured to achieve a distribution in which each cache is targeted by one-fourth, or about one-fourth, of the memory requests.

In block 608, in an embodiment, a second hash of the address is also performed to select a set of cache lines in the selected cache. In an embodiment, the second hash is based on a specified distribution of memory requests among sets of cache lines; that is, the first hash is configured to achieve a desired distribution of a number of times each set of cache lines is selected in response to memory requests. For example, if there are 16 sets of cache lines per cache, then the second hash is configured to achieve a distribution in which each set is targeted by one-sixteenth, or about one-sixteenth, of the memory requests. In an embodiment, the address of the memory request is derived using a reverse hash of the set address generated by the second hash.

In block 610, the memory request is processed at the selected cache according to the type of operation, unless the operation results in a cache miss, in which case the memory request is directed to main memory. Also, operations such as cache write-back operation or a cache replacement operation also rely on accessing main memory.

The flowchart 700 of FIG. 7 includes examples of operations performed when there is a cache miss, or when the type of operation (block 602 of FIG. 6) is a cache write-back operation or a cache replacement operation.

In block 702 of FIG. 7, a third hash of the address is performed to select a memory controller. In an embodiment, the third hash is based on a specified distribution of memory requests among memory controllers coupled to the system 100; that is, the third hash is configured to achieve a desired distribution of a number of times each memory controller is selected in response to memory requests. For example, if there are six memory controllers, then the third hash is configured to achieve a distribution in which each memory controller is targeted by one-sixth, or about one-sixth, of the memory requests. Also, in an embodiment, the third hash is configured so that a memory controller that is physically located nearer the selected cache (relative to other memory controllers) is selected.

In block 704, a fourth hash of the address is performed to select a bank group and a bank in main memory. In an embodiment, the fourth hash is based on a specified distribution of memory requests among bank groups and banks coupled to the system 100; that is, the fourth hash is configured to achieve a desired distribution of a number of times each bank group and each bank is selected in response to memory requests.

In block 706, the memory request is processed at the main memory according to the type of operation.

Thus, in embodiments according to the present invention, a memory request can quickly target a cache (e.g., a TAD), and can also quickly target a specific set of cache lines within the selected cache. This also enables a memory controller that is physically nearest to the selected cache to be targeted in the event of, for example, a cache miss, thereby reducing traffic in the system/network in the system (chip) 100 (FIG. 1) that transports the memory requests to the caches and main memory and alleviating congestion on that system/network. Memory requests can be evenly distributed across groups of caches, caches in the groups, cache lines in the caches, memory controllers, and bank groups and banks in main memory, alleviating contention between requests at these memory components.

The hierarchy of memory request distribution operations presented in the above embodiments can be summarized as follows:
cache group selection;
cache selection;
set of cache lines selection;
memory controller and DRAM selection; and
bank group and bank selection.

These memory request distribution operations are now described in more detail.

Cache group selection: In the embodiment of FIG. 2, the caches 208 are located on one side of the cluster 102, and the caches 210 are located on the other side of the cluster. Specifically, in the embodiment of FIG. 2, the caches 208 are on the left side of the cluster 102, and the caches 210 are on the right side of the cluster. In embodiments according to the present invention, to evenly distribute memory requests between two groups of caches as described above, a programmable set of registers is used to select an address bit in the memory request and to select a sequence of bits in the address that is hashed (e.g., XORed) with the selected bit. As a result of the hash, either the left (first) group of caches 208 or the right (second) group of caches 210 is selected. In this example, two groups of caches are used; however, the present invention is not so limited, and the memory request distribution process can be configured to evenly distribute memory requests among more than two groups of caches.

In an embodiment, the seventh bit is selected so that memory requests with a stride of greater than 128 will not always be sent to the same group of caches. In an embodiment, the number of bits in the sequence of bits used for the hash operation is defined based on a desired page size (e.g., four kilobytes), so that if the stride crosses pages then there will be an even (or nearly even) distribution across pages although not necessarily within the page. Although they are programmable, once the bits that will be used to select a group of caches are selected, they are not changed once data is stored.

Cache selection: After the cache group has been selected, a specific cache (e.g., a TAD) in the group is selected by performing another hash of the address. In an embodiment in which the number of caches in a group is a power of two (e.g., four), the address bits are hashed (e.g., XORed) using a set of bits that can be specified in a set of registers. The specified set of bits is selected so that the memory requests are evenly distributed among the caches in the selected group as described above. This hashing is performed after adjusting the address with the cache group selection hash described above.

In an embodiment in which the number of caches in a group is not a power of two (e.g., nine caches per group, TAD0-TAD8), to avoid performing modulus arithmetic, a 12-bit hash is generated on the address. If the hash value is less than or equal to 3640 (3640=8/9*(2^12)), then the request is sent to the cache identified by the bottom three bits of the hash value (e.g., one of TAD0-TAD7). If the hash value is greater than 3640, then the request is sent to TAD8. Consequently, each of the nine caches in the selected group receives about one-ninth of the memory requests. Accordingly, the memory results are fairly distributed by allocating them in approximately equal amounts, in a fairly random way. This also avoids issues with strides of a certain length all going to the same cache.

Set of cache lines selection: After the cache (e.g., a TAD) has been selected, a particular set of cache lines in the cache is selected by performing another hash of the address. Although the address is distributed to different caches, the number of caches is small, so hashing the address again avoids regular strides from falling on the same set of cache lines. In an embodiment, a group of registers is used to select which bits of the address are hashed (e.g., XORed) for each bit of the set, thereby adding flexibility to the memory request distribution process.

The original address can be derived from the set address by means of a reverse hash, so that it is not necessary to store the original set address in the tags. In an embodiment, another set of registers is provided to program the reverse hash. In an embodiment, the initial address hashing registers includes one register per hash and is as wide as the address (at least the widest address that could be used in the hash), and the reverse hash also includes one register per hash that is the width of the hash. To perform the reverse hash, the original cache address hash is applied to the address that includes the tag, and the set bits are set to zero. The resulting hash is then XORed bitwise with the set address. The XOR result is applied to the reverse hash registers to generate the original address. The reverse hash registers can be automatically generated when the cache hash registers are programmed. This can be accomplished with a state machine that cycles through all the possible hash values, applies the original hash, and selects the reverse hash register values. The reverse hash register for hash bit n would contain the value that resulted in only the nth bit being set in the hash.

Memory controller and DRAM selection: On a cache miss, or for a cache write-back or replacement operation, the memory request will target a specific memory controller. If there is an even number of memory controllers and they are equally distributed on either side of the chip (e.g., as in the embodiment of FIG. 5), then the memory requests are distributed evenly among the memory controllers using the process described above. More specifically, in the embodiments of FIGS. 2 and 5, memory requests that initially targeted a cache (e.g., a TAD) in the caches 208 on the left side of the chip are sent to the memory controllers 502, 504, and 506 on that side, and memory requests that initially targeted a cache in the caches 210 on the right side of the chip are sent to the memory controllers 508, 510, and 512 on that side.

However, if the number of memory controllers is not even or if the memory controllers are not equally distributed on either side of the chip (e.g., as in the embodiment of FIG. 4), then the address can be hashed again to evenly distribute the memory requests across the memory controllers. Furthermore, in an embodiment, the hash is configured so that a memory request that targets a particular cache, for example, is directed to the memory controller that is physically closer to that cache then another memory controller and hence is also directed to a closer DRAM.

For example, in the embodiments of FIGS. 2 and 4, one memory controller (the memory controller 402) is located on the left side of the clusters 400a-d, and two memory controllers (the memory controllers 404 and 406) are located on the right side of those clusters. In corresponding fashion, the caches 208 are located on the left side of the cluster 102, and the caches 210 are located on the right side of the chip. In an embodiment, memory requests that initially targeted a cache (e.g., a TAD) in the caches 210 on the right are sent to the memory controllers 404 and 406 on the right, while two-thirds of the requests that initially targeted a cache in the caches 208 on the left are sent to the memory controller 402 on the left and one-third of those requests are sent to the memory controllers on the right. In this manner, each memory controller and the associated DRAM(s) are similarly utilized while also balancing traffic between the caches and the memory controllers and DRAMs.

To avoid memory requests with a given stride always targeting one memory controller or DRAM, a hash of the lower few bits of the address is applied, to further facilitate a more even distribution. In an embodiment, the bottom four bits are hashed to allow for a flexible distribution to the memory controllers and DRAMs. Also, a specific memory controller, or a particular subset of the memory controllers, can be targeted by comparing the address to a set of base and limit registers. Alternatively, a particular block of addresses can be targeted to a selected memory controller to make use of features like the open-page policy.

Bank group and bank selection: At this point, the memory requests are evenly distributed across the memory controllers and DRAMs, and those memory requests can be distributed across bank groups and banks within a selected bank group by applying another hash to the address. In an embodiment, a set of registers is used to specify which bits in the address are to be included in the hash calculation. In this manner, additional flexibility is provided in the memory address distribution process.

Thus, in embodiments according to the present invention, memory requests from a core processor or processors are distributed to different caching units (e.g., TADs) and, if necessary, to different memory (e.g., DRAM) controllers and memory locations, in a way that reduces latency and improves performance. Embodiments according to the present invention provide an efficient and flexible mechanism for distributing memory requests among different memory components (e.g., caches, memory controllers, and main memory), thereby reducing latency and improving performance. Contention between memory requests is alleviated, and congestion in the network/system that is transporting the requests is reduced. Hashes can be programmed to refine or tailor the distributions of the request and fine tune performance. Hence, the mechanism for distributing requests is flexible and can be efficiently implemented so that it does not introduce latency.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A computer-implemented method, comprising:
accessing a memory request comprising an address, wherein the memory request comprises a first operation associated with an instance of data;
selecting a group of caches from a plurality of groups of caches using a bit in the address;
selecting a cache in the group of caches using a first hash of the address; and
when the first operation results in a cache miss, performing a second operation to access a memory outside the cache, and otherwise processing the memory request at the cache according to the first operation.

2. The method of claim 1, wherein said selecting a group of caches further comprises hashing the bit with selected other bits in the address.

3. The method of claim 2, wherein the bit and the selected other bits are selected based on a specified distribution of a number of times each group of caches of the plurality of groups of caches is selected.

4. The method of claim 1, wherein the first hash is configured based on a specified distribution of a number of times each cache in the group of caches is selected.

5. The method of claim 1, further comprising, after said selecting a cache, selecting a set of cache lines from a plurality of sets of cache lines in the cache using a second hash of the address.

6. The method of claim 5, wherein the second hash is configured based on a specified distribution of a number of times each set of cache lines of the plurality of sets of cache lines is selected.

7. The method of claim 5, wherein which bits are hashed for said selecting a group of caches, which bits are selected for the first hash, and which bits are selected for the second hash, are independently programmable.

8. The method of claim 5, wherein the second hash generates a set address corresponding to the set of cache lines that is selected, the method further comprising deriving the address of the memory request using a reverse hash of the set address.

9. The method of claim 5, wherein the second operation comprises selecting a memory controller from a plurality of memory controllers using a third hash of the address, the memory controllers configured to enable access to the memory outside the cache.

10. The method of claim 9, wherein the third hash is configured based on a specified distribution of a number of times each memory controller of the plurality of memory controllers is selected.

11. The method of claim 9, wherein the second operation further comprises selecting a bank group and a bank from a plurality of bank groups and a respective plurality of banks in the memory using a fourth hash of the address.

12. The method of claim 11, wherein the fourth hash is configured to achieve a specified distribution of a number of times each bank group of the plurality of bank groups and each bank of the respective plurality of banks is selected.

13. A system, comprising:
a processor; and
a plurality of caches coupled to the processor;
wherein the processor is operable for executing instructions that, when executed, perform operations comprising:
accessing a memory request comprising an address, wherein the memory request comprises a first operation associated with an instance of data;
using a bit in the address to select a group of caches from the plurality of caches;
performing a first hash of the address to select a cache in the group of caches;
unless the first operation results in a cache miss in the cache, processing the memory request at the cache according to the first operation; and
when the first operation results in a cache miss, performing a second operation to access memory coupled to the system.

14. The system of claim 13, wherein said using a bit comprises hashing the bit with selected other bits in the address to select the group of caches.

15. The system of claim 13, wherein the operations further comprise, after the cache is selected, performing a second hash of the address to select a set of cache lines from a plurality of sets of cache lines in the cache.

16. The system of claim 15, further comprising a plurality of memory controllers coupled to the processor and configured to enable access to the memory, wherein the second operation comprises performing a third hash of the address to select a memory controller from the plurality of memory controllers.

17. The system of claim 16, wherein the second operation further comprises performing a fourth hash of the address to select a bank group and a bank from a plurality of bank groups and a respective plurality of banks in the memory.

18. A system, comprising:
- means for accessing a memory request comprising an address, wherein the memory request comprises a first operation associated with an instance of data;
- means for selecting a group of caches from a plurality of groups of caches using a bit in the address;
- means for performing a first hash of the address to select a cache in the group of caches;
- means for performing a second operation to access a memory outside the cache when the first operation results in a cache miss; and
- means for processing the memory request at the cache according to the first operation.

19. The system of claim 18, further comprising means for hashing the bit with selected other bits in the address to select the group of caches.

20. The system of claim 18, further comprising means for performing a second hash of the address to select a set of cache lines from a plurality of sets of cache lines in the cache.

21. The system of claim 20, wherein the means for performing a second operation comprises means for performing a third hash of the address to select a memory controller from a plurality of memory controllers configured to enable access to the memory.

22. The system of claim 21, further comprising means for performing a fourth hash of the address to select a bank group and a bank from a plurality of bank groups and a respective plurality of banks in the memory.

* * * * *